United States Patent
Han

(10) Patent No.: US 9,751,794 B2
(45) Date of Patent: Sep. 5, 2017

(54) FRIT SEALING SYSTEM

(71) Applicant: SAMSUNG DISPLAY CO., LTD., Yongin, Gyeonggi-Do (KR)

(72) Inventor: Jeong-Won Han, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 196 days.

(21) Appl. No.: 14/206,141

(22) Filed: Mar. 12, 2014

(65) Prior Publication Data

US 2015/0040613 A1 Feb. 12, 2015

(30) Foreign Application Priority Data

Aug. 9, 2013 (KR) .......................... 10-2013-0094893

(51) Int. Cl.
| | | |
|---|---|---|
| C03B 23/20 | (2006.01) |
| C03B 23/00 | (2006.01) |
| C03C 23/00 | (2006.01) |
| C03C 27/10 | (2006.01) |

(52) U.S. Cl.
CPC .......... *C03B 23/20* (2013.01); *C03C 23/0025* (2013.01); *C03C 27/10* (2013.01)

(58) Field of Classification Search
CPC ...... C03B 23/20; C03C 23/0025; C03C 27/10
USPC .............................. 65/152, 155, 33.6; 445/25
See application file for complete search history.

(56) References Cited

U.S. PATENT DOCUMENTS

| | | | | |
|---|---|---|---|---|
| 6,128,066 | A | * | 10/2000 | Yokozeki .............. G02F 1/1339 349/1 |
| 2003/0066311 | A1 | | 4/2003 | Li et al. |
| 2007/0197120 | A1 | * | 8/2007 | Lee .......................... C03C 8/24 445/25 |
| 2009/0229745 | A1 | | 9/2009 | Lee et al. |
| 2009/0233514 | A1 | | 9/2009 | Lee et al. |
| 2010/0279577 | A1 | | 11/2010 | Joo et al. |
| 2011/0140373 | A1 | | 6/2011 | Lee et al. |

FOREIGN PATENT DOCUMENTS

| | | |
|---|---|---|
| JP | 2003-123966 A | 4/2003 |
| KR | 10-2007-0078499 A | 8/2007 |
| KR | 10-2009-0098187 A | 9/2009 |
| KR | 10-2009-0099222 A | 9/2009 |
| KR | 10-2010-0013878 A | 2/2010 |
| KR | 10-2010-0119371 A | 11/2010 |
| KR | 10-1030000 B1 | 4/2011 |

* cited by examiner

*Primary Examiner* — Alison L Hindenlang
*Assistant Examiner* — Mohamed K Ahmed Ali
(74) *Attorney, Agent, or Firm* — Lee & Morse P.C.

(57) ABSTRACT

Provided is a frit sealing system for attaching a first substrate and a second substrate by using a frit. The frit sealing system includes a laser irradiation member configured to irradiate a laser on the frit between the first substrate and the second substrate, and a pressurization member on the second substrate, the pressurization member being configured to apply pressure to the second substrate during the irradiation of the laser, the pressurization member including base, and an elastic portion connected to the base and contacting the second substrate.

20 Claims, 4 Drawing Sheets

FRIT SEALING SYSTEM

CROSS-REFERENCE TO RELATED APPLICATION

Korean Patent Application No. 10-2013-0094893, filed on Aug. 9, 2013, in the Korean Intellectual Property Office, and entitled: "Frit Sealing System," is incorporated by reference herein in its entirety.

BACKGROUND

1. Field

One or more embodiments relate to frit sealing systems.

2. Description of the Related Art

Recently, display apparatuses have been replaced with portable slim flat panel display apparatuses. Of the flat panel display apparatuses, a field emission display apparatus is a self-luminous display apparatus having excellent characteristics in terms of wide viewing angles, high contrast, and fast response time. Therefore, the field emission display apparatus is considered as a next-generation display apparatus. An organic light-emitting display apparatus includes an emission layer formed of an organic material. Compared with an inorganic light-emitting display apparatus, the organic light-emitting display apparatus has excellent characteristics in terms of brightness, driving voltage, and response time, and may represent multiple colors.

When moisture or oxygen is introduced from the external environment into devices of the organic light-emitting display apparatus, the life of the devices may be reduced due to oxidation or peeling of electrode materials, the luminous efficiency of the organic light-emitting display apparatus may be reduced, and discoloration of emitted colors may occur. Therefore, in manufacturing the organic light-emitting display apparatus, a sealing process is performed for separating the devices from the outside and preventing penetration of moisture.

SUMMARY

According to one or more embodiments, a frit sealing system for attaching a first substrate and a second substrate by using a fit may include a laser irradiation member configured to irradiate a laser on the frit between the first substrate and the second substrate, and a pressurization member on the second substrate, the pressurization member being configured to apply pressure to the second substrate during the irradiation of the laser, the pressurization member including base, and an elastic portion connected to the base and contacting the second substrate.

The frit sealing system may further include a space between the base and the elastic portion, the space including fluid.

When the fluid fills the space between the base and the elastic portion, the elastic portion may be configured to apply pressure to the second substrate.

The elastic portion may include material that transmits the laser.

The laser may be configured to pass through the base, the fluid, the elastic portion, and the second substrate to be irradiated on the frit.

The fit sealing system may further include a transmission portion connected to the elastic portion, the transmission portion being configured to transmit the laser.

The transmission portion may overlap the frit between the first substrate and the second substrate.

Each of the frit and the transmission portion may have a closed-curve pattern.

The laser may be configured to pass through the base, the fluid, the transmission portion, and the second substrate to be irradiated on the fit.

The transmission portion may include a plurality of transmission portions.

The fluid may be air.

The elastic portion may be configured to apply pressure to the second substrate while the pressurization member is moving in a vertical direction.

The elastic portion may include a material that transmits the laser.

The elastic portion may include a rubber material.

The elastic portion may include a center portion flush against and in direct contact with the entire second substrate.

The frit sealing system may further include a transmission portion connected to the elastic portion and configured to transmit the laser.

The transmission portion may be positioned within openings in the elastic portion, the transmission portion overlapping the frit between the first substrate and the second substrate.

The frit and the transmission portion may be disposed to have a closed-curve shape.

The laser may pass through the base, the transmission portion, and the second substrate and is irradiated on the frit.

The transmission portion may include a plurality of transmission portions.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
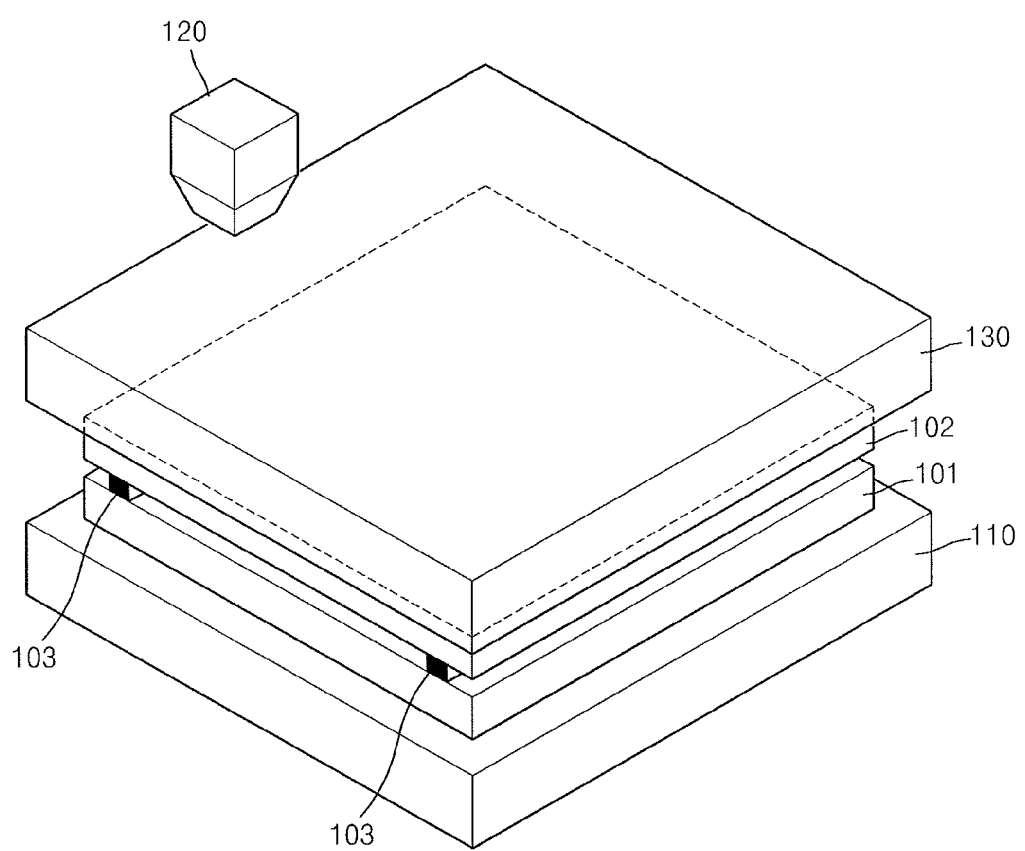
FIG. 1 illustrates a schematic perspective view of a frit sealing system according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to provide a thorough and complete disclosure.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present.

As used herein, the term "and/or" includes any and all combinations of one or more of the associated listed items. Also, as used herein, the term "frit" refers not only to powdered glass, but also collectively refers to gel glass including a gel organic material, solid glass cured by irradiating a laser thereon, etc.

FIG. 1 illustrates a schematic perspective view of a frit sealing system according to an embodiment.

Referring to FIG. 1, a frit sealing system according to an embodiment may include a bed member 110, a laser irradiation member 120, and a pressurization member 130. A first substrate 101 and a second substrate 102 may be placed on the bed member 110, and frit 103 may be coated between the first substrate 101 and the second substrate 102.

The laser irradiation member 120 melts and attaches the frit 103 by irradiating a laser L (FIG. 2) on the frit 103 between the first substrate 101 and the second substrate 102.

The pressurization member 130 may be disposed on the second substrate 102. The pressurization member 130 applies pressure to the second substrate 102 during the irradiation of the laser L. That is, in order to prevent or substantially minimize, e.g., peeling and/or reliability result, when curing the frit 103 by irradiating the laser L thereon for the purpose of sealing, the pressurization member 130 is used to apply pressure to the second substrate 102.

The structure of the pressurization member 130 will be described in detail below with reference to FIGS. 2 to 5.

Figure 2:
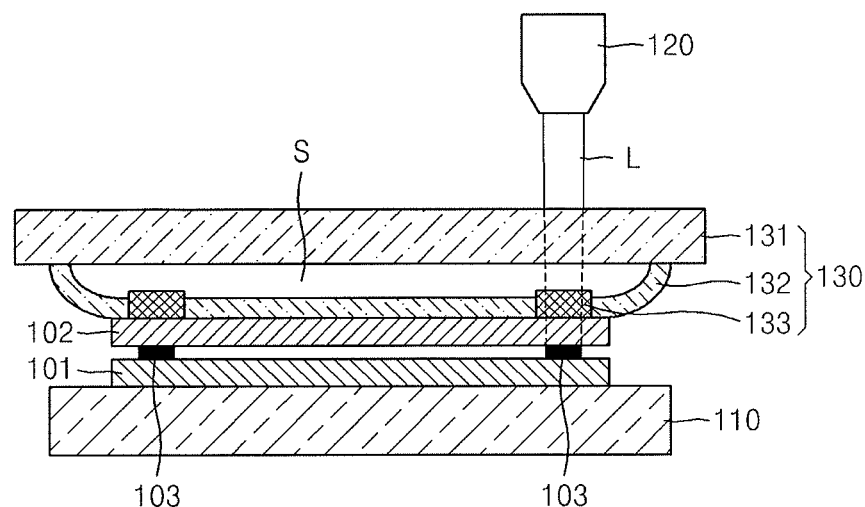
FIG. 2 illustrates a side cross-sectional view of a frit sealing system according to an embodiment.

FIG. 2 illustrates a side cross-sectional view of the frit sealing system according to an embodiment.

Referring to FIG. 2, the frit sealing system according to an embodiment may include the bed member 110, the laser irradiation member 120, and the pressurization member 130.

The first substrate 101 and the second substrate 102 are placed on the bed member 110. Frit 103 are coated between the first substrate 101 and the second substrate 102. For example, the frit 103 may be disposed between the first substrate 101 and the second substrate 102 in a closed-curve pattern, e.g., two portions of a single close-curve pattern of the frit 103 are illustrated in the cross-section of FIG. 2.

The laser irradiation member 120 melts and attaches the frit 103 by irradiating the laser L on the frit 103 between the first substrate 101 and the second substrate 102. For example, as illustrated in FIG. 2, the laser irradiation member 120 may be positioned above the pressurization member 130, so the laser L is irradiated through the pressurization member 130 and through the second substrate 102 toward the frit 103.

The pressurization member 130 is disposed on the second substrate 102. The pressurization member 130 applies pressure to the second substrate 102 during the irradiation of the laser L. The pressurization member 130 may include a base 131, an elastic portion 132, and a transmission portion 133.

The base 131 may be formed of a material that is capable of transmitting the laser L. The base 131 may be formed of, e.g., glass, quartz, germanium, ceramic, or a polymer.

The elastic portion 132 is connected to the base 131 and contacts the second substrate 102. The elastic portion 132 may be formed of an elastic flexible material, e.g., a rubber or a silicon rubber.

For example, the elastic portion 132 may include end portions connected to opposite ends of the base 131, and a center portion spaced apart from the base 131 to contact the second substrate 102. Since the end portions of the elastic portion 132 contact the base 131 and the center portion of the elastic portion 132 contacts the second substrate 102, a space S may be formed between the base 131 and the center portion of the elastic portion 132. A fluid may be injected into the space S between the base 131 and the center portion of the elastic portion 132. By forming a fluid injection port (not illustrated) in the base 131 or in the elastic portion 132, a fluid may be injected into the space S between the base 131 and the center portion of the elastic portion 132. Air may be used as the fluid injected into the space S.

When the fluid is injected into the space S between the base 131 and the center portion of the elastic portion 132, the elastic portion 132 may apply pressure to the second substrate 102. For example, the center portion of the elastic portion 132 may extend in parallel to and in direct contact with the, e.g., entire, second substrate 102.

Since pressure is applied by the elastic portion 132, contact between the pressurization member 130 and the second substrate 102 and the application of a uniform pressure are more easily facilitated. In addition, since a portion of the pressurization member 130 contacting the second substrate 102 is formed of a flexible material, it is possible to reduce potential damage to the second substrate 102, e.g., due to pressure concentration caused by particles when the pressure is applied. Also, since the pressure is applied by injecting the fluid into the space S between the base 131 and the elastic portion 132, the pressure applied to the second substrate 102 may be adjusted, e.g., controlled, based on an amount of the fluid injected into the space S. Further, since the injected fluid exerts a uniform force, e.g., pressure, in all directions, uniform pressure may be applied to the, e.g., entire, second substrate 102. Therefore, it is easy to apply the same pressure to all regions of the second substrate 102.

The transmission portion 133 is connected to the elastic portion 132 and may transmit the laser L irradiated by the laser irradiation member 120. The transmission portion 133 may be formed of a material that is capable of transmitting the laser L. The transmission portion 133 may be formed of, e.g., glass, quartz, germanium, ceramic, or a polymer.

The transmission portion 133 may be formed in a region of the elastic portion 132 that corresponds to, e.g., overlaps, a region of the first substrate 101 and the second substrate 102 that is coated with the frit 103. When the frit 103 have a closed-curve shape, the transmission portion 133 may also be disposed corresponding to, e.g., overlapping, the closed-curve shape of the frit 103. Since the transmission portion 133 is formed in the region of the elastic portion 132 that corresponds to a region of the first substrate 101 and the second substrate 102 that is coated with the frit 103, the laser L may pass through the base 131, the fluid injected into the space S, the transmission portion 133, and the second substrate 102 to be irradiated on the frit 103.

The elastic portion 132 may be formed of a flexible material that is capable of transmitting the laser L. For example, the elastic portion 132 may be formed of a rubber or a silicon rubber that transmits light and having a wavelength that corresponds to that of the laser L. In this case, since the laser L passes through the elastic portion 132, it is unnecessary to separately form the transmission portion 133. Therefore, the laser L may pass through the base 131, the fluid injected into the space S, the elastic portion 132, and the second substrate 102 to be irradiated on the frit 103.

Figure 3:
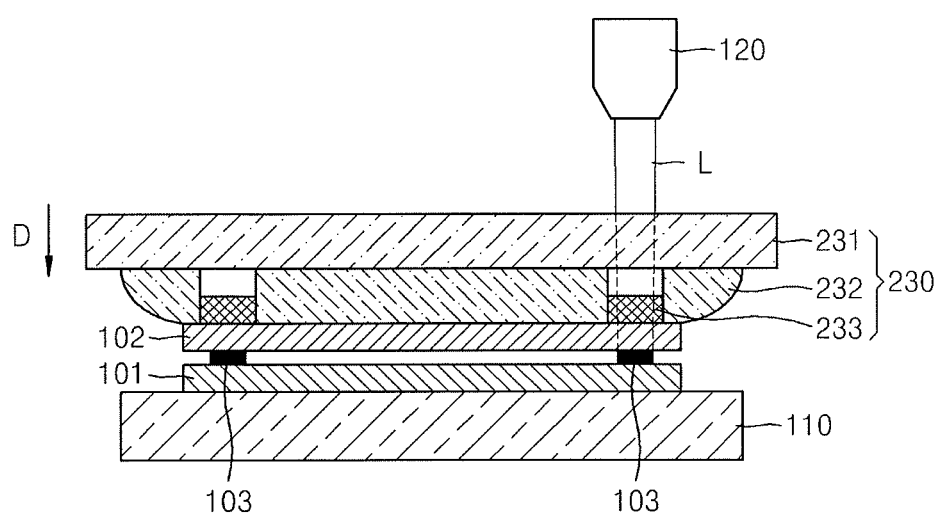
FIG. 3 illustrates a side cross-sectional view of a frit sealing system according to another embodiment.

FIG. 3 illustrates a side cross-sectional view of a frit sealing system according to another embodiment. The embodiment of FIG. 3 will be described below, focusing on differences between the embodiments of FIGS. 2 and 3.

Referring to FIG. 3, the frit sealing system according to the embodiment may include the bed member 110, the laser irradiation member 120, and a pressurization member 230. The frit 103 may be disposed between the first substrate 101 and the second substrate 102 in a closed-curve pattern, e.g., two cross-sections of one close-curve pattern of the frit 103 are illustrated in FIG. 3.

The pressurization member 230 may include a base 231, an elastic portion 232, and a transmission portion 233. The base 231 may be formed of a material that is capable of transmitting the laser L.

The elastic portion 232 is connected to the base 231 and contacts the second substrate 102. The elastic portion 232 may be formed of an elastic flexible material.

One surface of the elastic portion 232 may contact one surface of the base 231 as a whole, e.g., a first surface of the elastic portion 232 may be flat and may be positioned flush against the base 231, and another surface of the elastic portion 232 may contact the second substrate 102. Unlike in the embodiment of FIG. 2, the elastic portion 232 is substantially solid, i.e., no space is formed between the elastic portion 232 and the base 231. As described previously, a surface of the elastic portion 232 that is opposite to the surface of the elastic portion 232 contacting one surface of the base 231 may contact the second substrate 102.

The elastic portion 232 may apply pressure to the second substrate 102 while the pressurization member 230 is moving in a vertical direction D. Since the pressure is applied by the elastic portion 232, contact between the pressurization member 230 and the second substrate 102 and the application of a uniform pressure are more easily facilitated. In addition, since the portion of the pressurization member 230 contacting the second substrate 102 is formed of a flexible material, it is possible to reduce damage to the substrate that would otherwise result due to a pressure concentration that is caused by particles when the pressure is applied.

The transmission portion 233 is connected to the elastic portion 232 and may transmit the laser L irradiated by the laser irradiation member 120. The transmission portion 233 may be formed of a material that is capable of transmitting the laser L.

The transmission portion 233 may be formed in a region of the elastic portion 232 that corresponds to, e.g., overlaps, a region of the first substrate 101 and the second substrate 102 that is coated with the frit 103. For example, when the frit 103 has a closed-curve shape, a groove having a closed-curve shape may be formed through the elastic portion 232 to overlap the fit 103 and to be filled with the transmission portion 233. Since the transmission portion 233 is formed in the region of the elastic portion 132 that corresponds to a region of the first substrate 101 and the second substrate 102 that is coated with the frit 103, the laser L may pass through the base 131, the transmission portion 233, and the second substrate 102 to be irradiated on the frit 103.

The elastic portion 232 may be formed of a flexible material that is capable of transmitting the laser L. The elastic portion 232 may be formed of a rubber or a silicon rubber that transmits light having a wavelength that corresponds to that of the laser L. In this case, since the laser L passes through the elastic portion 232, it is unnecessary to separately form the transmission portion 233. Therefore, the laser L may pass through the base 231, the elastic portion 232, and the second substrate 102 to be irradiated on the frit 103.

Figure 4:
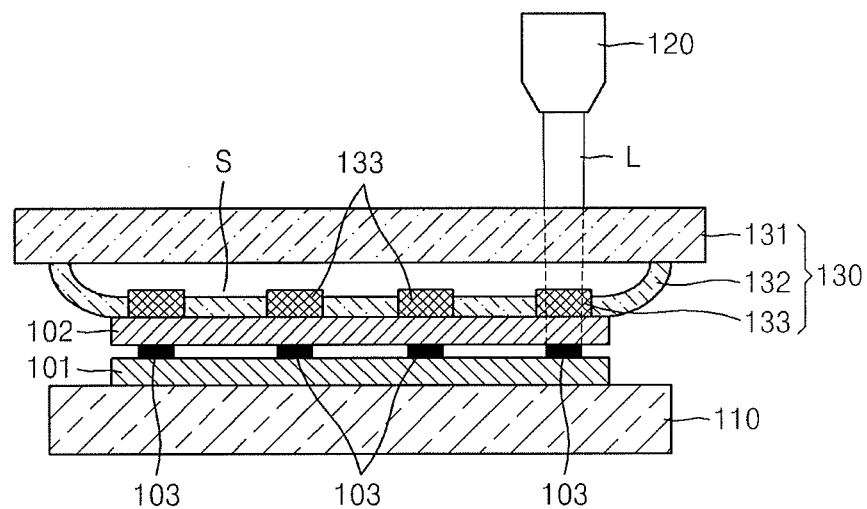
FIG. 4 illustrates a side cross-sectional view of a frit sealing system according to another embodiment.

FIG. 4 illustrates a side cross-sectional view of a frit sealing system according to another embodiment. The embodiment of FIG. 4 will be described below, focusing on differences between the embodiments of FIGS. 2 and 4.

Referring to FIG. 4, a frit sealing system according to an embodiment may include the bed member 110, the laser irradiation member 120, and the pressurization member 130.

The frit sealing system may simultaneously and/or sequentially attach first substrates and second substrates of one or more rows and one or more columns. If describing this from a different viewpoint, after one large mother board is attached at one time, the mother board is cut and then used as a plurality of organic light-emitting display apparatuses. In this case, the frit 103 may be disposed between the first substrate 101 and the second substrate 102 as a plurality of closed-curve patterns. A plurality of cross-sections corresponding to a plurality of close-curve patterns of the frit 103 are illustrated in FIG. 4.

The pressurization member 130 may include the base 131, the elastic portion 132, and a plurality of transmission portions 133. The transmission portions 133 may be formed in regions of the elastic portion 132 that correspond to regions of the first substrate 101 and the second substrate 102 that are coated with the frit 103. When a plurality of closed-curve patterns of frit 103 is formed, the plurality of transmission portions 133 may be disposed corresponding to the plurality of closed-curve patterns of the frit 103. Since the transmission portions 133 are formed in the region of the elastic portion 132 that corresponds to a region of the first substrate 101 and the second substrate 102 that is coated with the frit 103, the laser L may pass through the base 131, the fluid injected into the space S, the transmission portions 133, and the second substrate 102 to be irradiated on the fit 103. In this manner, a plurality of flat panel display apparatuses may be manufactured on a thin film transistor (TFT) substrate at the same time.

Figure 5:
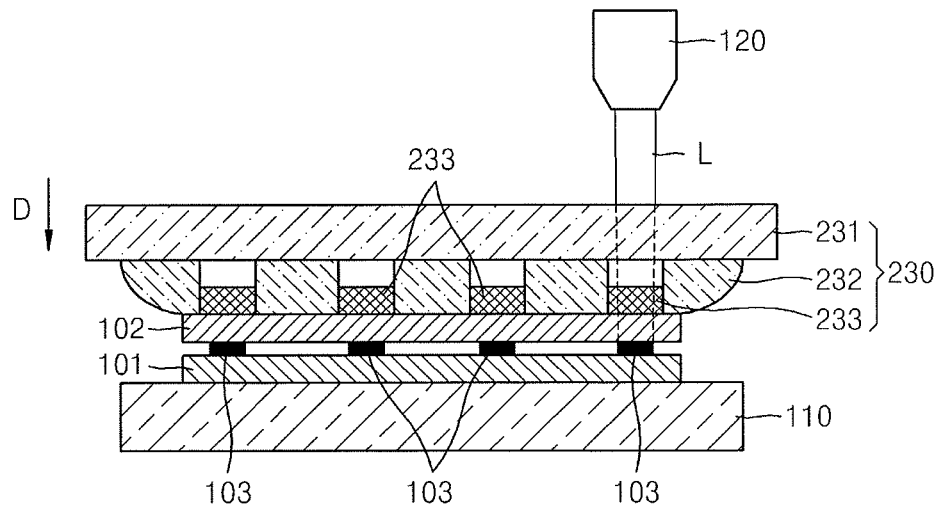
FIG. 5 illustrates a side cross-sectional view of a frit sealing system according to another embodiment.

FIG. 5 illustrates a side cross-sectional view of a frit sealing system according to another embodiment. The embodiment of FIG. 5 will be described below, focusing on differences between the embodiments of FIGS. 3 and 5.

Referring to FIG. 5, a frit sealing system according to an embodiment may include the bed member 110, the laser irradiation member 120, and the pressurization member 230.

The frit sealing system may simultaneously and/or sequentially attach first substrates and second substrates of one or more rows and one or more columns. If describing this from a different viewpoint, after one large mother board is attached at one time, the mother board is cut and then used as a plurality of organic light-emitting display apparatuses. In this case, the frit 103 may be disposed between the first substrate 101 and the second substrate 102 as a plurality of closed-curve patterns. A plurality of cross-sections by the plurality of close-curve patterns of the frit 103 are illustrated in FIG. 5.

The pressurization member 230 may include the base 231, the elastic portion 232, and a plurality of transmission portions 233.

The transmission portions 233 may be formed in region of the elastic portion 132 that corresponds to a region of the first substrate 101 and the second substrate 102 that is coated with the fit 103. When a plurality of frit 103 are formed as each having a closed-curve pattern, the plurality of transmission portions 233 may also be disposed corresponding to the plurality of closed-curve patterns of the frit 103. Since the transmission portions 233 are formed in the region of the elastic portion 132 that corresponds to a region of the first substrate 101 and the second substrate 102 that is coated with the frit 103, the laser L may pass through the base 231, the transmission portions 233, and the second substrate 102 to be irradiated on the frit 103. In this manner, a plurality of flat panel display apparatuses may be manufactured on a TFT substrate at the same time.

Figure 6:
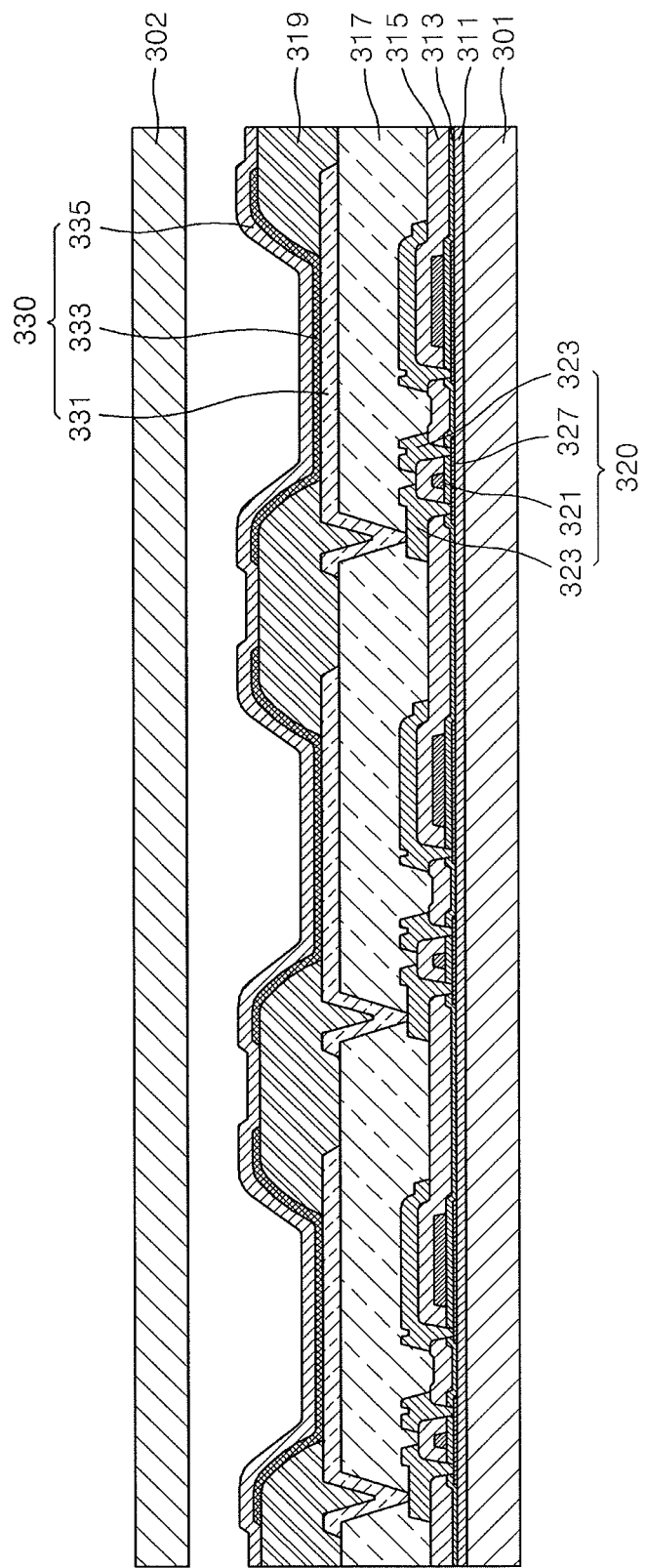
FIG. 6 illustrates a cross-sectional view of a part of an organic light-emitting display apparatus according to an embodiment.

FIG. 6 illustrates a cross-sectional view of a part of an organic light-emitting display apparatus manufactured by a frit sealing system, according to an embodiment. A detailed configuration of a display unit is exemplarily illustrated in FIG. 6.

Referring to FIG. 6, a plurality of TFTs 320 may be provided on a substrate 301, and an organic light-emitting device 330 may be provided on each of the TFTs 320. The organic light-emitting device 330 may include a pixel electrode 331 electrically connected to the TFT 320, an opposite electrode 335 disposed over the entire substrate 301, and an intermediate layer 333 disposed between the pixel electrode 331 and the opposite electrode 335 and including at least an emission layer.

The TFT 320 may include a gate electrode 321, a source electrode, 323, a drain electrode 323, a semiconductor layer 327, a gate insulating film 313, and an interlayer insulating layer 315. The TFT 320 is not limited to the structure of FIG. 6. A variety of TFTs, including an organic TFT in which the semiconductor layer 327 is formed of an organic material, a silicon TFT in which the semiconductor layer 327 is formed of silicon, may be used. When necessary, a buffer layer 311 formed of silicon oxide or silicon nitride may be further provided between the TFT 320 and the substrate 301.

As described previously, the organic light-emitting device 330 may include the pixel electrode 331 and the opposite electrode 335 facing each other, and the intermediate layer 333 formed of an organic material and provided therebetween. The intermediate layer 333 includes at least an emission layer and may include a plurality of layers.

The pixel electrode 331 may function as an anode electrode, and the opposite electrode 335 may function as a cathode electrode. Polarities of the pixel electrode 331 and the opposite electrode 335 may be reversed.

The pixel electrode 331 may be provided as a transparent electrode or a reflection electrode. When provided as the transparent electrode, the pixel electrode 331 may be formed of indium tin oxide (ITO), indium zinc oxide (IZO), zinc oxide (ZnO), or indium oxide ($In_2O_3$). When provided as the reflection electrode, the pixel electrode 331 may include a reflection film formed of, e.g., silver (Ag), magnesium (Mg), aluminum (Al), platinum (Pt), palladium (Pd), gold (Au), nickel (Ni), neodymium (Nd), iridium ((Ir), chromium (Cr), or any compounds thereof, and a film disposed on the reflection film and formed of ITO, IZO, ZnO, or $In_2O_3$.

The opposite electrode 335 may be provided as a transparent electrode or a reflection electrode. When provided as the transparent electrode, the opposite electrode 335 may include a film in which, e.g., Li, Ca, LiF/Ca, LiF/Al, Al, Mg, or any compounds thereof is deposited to face the intermediate layer 333 between the pixel electrode 331 and the opposite electrode 335, and an auxiliary electrode or a bus electrode line disposed on the film and formed of a material for a transparent electrode, such as ITO, IZO, ZnO, or $In_2O_3$. When provided as the reflection electrode, the opposite electrode 335 may be provided by depositing, e.g., Li, Ca, LiF/Ca, LiF/Al, Al, Mg, or any compounds thereof.

A pixel defining layer (PDL) 319 may be provided to cover an edge of the pixel electrode 331 and be thicker toward the outside of the pixel electrode 331. The PDL 319 serves to define an emission region and prevent a concentration of an electric field on the edge of the pixel electrode 331 by widening a gap between the edge of the pixel electrode 331 and the opposite electrode 335. Therefore, a short-circuit between the pixel electrode 331 and the opposite electrode 335 is prevented.

A variety of intermediate layers 333 including at least an emission layer are provided between the pixel electrode 331 and the opposite electrode 335. The intermediate layers 333 may be formed of a low-molecular-weight organic material or a polymer organic material.

The organic light-emitting device 330 is electrically connected to the TFT 320 disposed thereunder. When a planarization film 317 covering the TFT 320 is provided, the organic light-emitting device 330 is disposed on the planarization film 317, and the pixel electrode 331 of the organic light-emitting device 330 is electrically connected to the TFT 320 through a contact hole provided in the planarization film 317.

The organic light-emitting device 330 provided on the substrate 301 is sealed by an encapsulation substrate 302. As described above, the encapsulation substrate 302 may be formed of various materials, e.g., glass or a plastic material.

By way of summary and review, in a conventional sealing process, an organic polymer, e.g., polyester (PET), may be laminated on a second electrode of an organic light-emitting display apparatus, or a cover or a cap formed of metal or glass, including a moisture absorbent, may be formed on the second electrode. An inside of such cover or cap may be filled with nitrogen gas, and edges of the cover or cap may be encapsulated with a sealant, e.g., epoxy. However, the conventional sealing process may not completely block device destructive factors, e.g., moisture or oxygen, from being introduced from the exterior. Hence, it may be difficult to apply the conventional sealing process to an active top-emission organic light-emitting display apparatus in which a device structure is vulnerable to moisture.

In contrast, according to example embodiments, an encapsulation method may improve an adhesion between a device substrate and a cap by using a fit as a sealant. This, in turn, improves mechanical reliability of the display device.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A frit sealing system for attaching a first substrate and a second substrate by using a frit, the frit sealing system comprising:

laser irradiation member configured to irradiate a laser on the frit between the first substrate and the second substrate; and a pressurization member on the second substrate, the pressurization member being configured to apply pressure to the second substrate during the irradiation of the laser, the pressurization member including:

a base, and an elastic portion connected to the base and contacting the second substrate, a first surface of the base facing the elastic portion, wherein end portions of the elastic portion are connected to opposite ends of the first surface of the base, and a center portion of the elastic portion extends between the end portions of the elastic portion to be parallel to the second substrate, a distance from the first surface of the base to a first surface of the center portion being permanently larger than a distance from the first surface of the base to first surfaces of the end portions, the first surfaces of the center portion and end portions of the elastic portion facing the second substrate, and wherein the laser passes through the base, the elastic portion, and the second substrate to be irradiated on the frit.

2. The frit sealing system as claimed in claim 1, wherein:
the center portion of the elastic portion contacts the second substrate, and
the pressurization member further comprises a space between the first surface of the base and the center portion of the elastic portion, the space including fluid.

3. The frit sealing system as claimed in claim 2, wherein, when the fluid fills the space between the base and the elastic portion, the elastic portion is configured to apply pressure to the second substrate such that injection of the fluid into the space causes the pressure to be applied to the second substrate by the elastic portion.

4. The frit sealing system as claimed in claim 2, wherein the elastic portion includes material that transmits the laser.

5. The frit sealing system as claimed in claim 2, further comprising a transmission portion connected to the elastic portion, the transmission portion being configured to transmit the laser.

6. The frit sealing system as claimed in claim 5, wherein the transmission portion overlaps the frit between the first substrate and the second substrate.

7. The frit sealing system as claimed in claim 6, wherein each of the fit and the transmission portion has a closed-curve pattern.

8. The frit sealing system as claimed in claim 5, wherein the laser is configured to pass through the base, the fluid, the transmission portion, and the second substrate to be irradiated on the frit.

9. The frit sealing system as claimed in claim 5, wherein the transmission portion includes a plurality of transmission portions.

10. The frit sealing system as claimed in claim 2, wherein the fluid is air.

11. The frit sealing system as claimed in claim 1, wherein:
a second surface of the center portion of the elastic portion is flat and positioned flush against the first surface of the base, and the first surface of the center portion of the elastic portion is opposite the first surface and contacts the second substrate, and
the elastic portion is configured to apply pressure to the second substrate while the pressurization member is moving in a vertical direction.

12. The frit sealing system as claimed in claim 1, wherein the elastic portion includes a material that transmits the laser.

13. The frit sealing system as claimed in claim 12, wherein the elastic portion includes a rubber material.

14. The frit sealing system as claimed in claim 13, wherein the center portion is flush against and in direct contact with the entire second substrate, the elastic portion maintaining direct and constant contact with the base.

15. The frit sealing system as claimed in claim 1, further comprising a transmission portion connected to the elastic portion and configured to transmit the laser.

16. The frit sealing system as claimed in claim 15, wherein the transmission portion is positioned within openings in the elastic portion, the transmission portion overlapping the frit between the first substrate and the second substrate.

17. The frit sealing system as claimed in claim 16, wherein the frit and the transmission portion are disposed to have a closed-curve shape.

18. The frit sealing system as claimed in claim 15, wherein the laser passes through the base, the transmission portion, and the second substrate and is irradiated on the frit.

19. The frit sealing system as claimed in claim 15, wherein the transmission portion includes a plurality of transmission portions.

20. The frit sealing system as claimed in claim 1, wherein a first surface of the elastic portion facing the second substrate has a curved shape, the curved shape including curved portions connecting the end portions to the center portion.

* * * * *